(12) United States Patent
Hsia

(10) Patent No.: US 9,801,241 B2
(45) Date of Patent: Oct. 24, 2017

(54) SOLID-STATE LIGHTING WITHOUT OPERATIONAL UNCERTAINTY AND FREE OF FIRE HAZARD

(71) Applicant: Lightel Technologies, Inc., Renton, WA (US)

(72) Inventor: Chungho Hsia, Bellevue, WA (US)

(73) Assignee: LIGHTEL TECHNOLOGIES, INC., Renton, WA (US)

( * ) Notice: Subject to any disclaimer, the term of this patent is extended or adjusted under 35 U.S.C. 154(b) by 1 day.

(21) Appl. No.: 15/132,167

(22) Filed: Apr. 18, 2016

(65) Prior Publication Data

US 2016/0234897 A1 Aug. 11, 2016

Related U.S. Application Data

(63) Continuation-in-part of application No. 15/050,363, filed on Feb. 22, 2016, which is a continuation-in-part of application No. 14/688,841, filed on Apr. 16, 2015, now Pat. No. 9,288,867, which is a continuation-in-part of application No. 14/465,174,
(Continued)

(51) Int. Cl.
| | |
|---|---|
| H05B 33/08 | (2006.01) |
| F21V 25/10 | (2006.01) |
| F21K 99/00 | (2016.01) |
| F21V 23/06 | (2006.01) |
| F21V 25/04 | (2006.01) |
| H02M 1/32 | (2007.01) |
| F21K 9/27 | (2016.01) |

(Continued)

(52) U.S. Cl.
CPC .......... *H05B 33/0815* (2013.01); *F21K 9/27* (2016.08); *F21V 23/06* (2013.01); *F21V 25/04* (2013.01); *H02M 1/32* (2013.01); *H05B 33/0803* (2013.01); *H05B 33/0806* (2013.01); *H05B 33/0845* (2013.01); *H05B 33/0884* (2013.01); *F21Y 2115/10* (2016.08); *H02M 2001/0058* (2013.01); *Y02B 20/347* (2013.01); *Y02B 20/348* (2013.01); *Y02B 70/1491* (2013.01)

(58) Field of Classification Search
None
See application file for complete search history.

(56) References Cited

U.S. PATENT DOCUMENTS

| | | | |
|---|---|---|---|
| 8,985,794 B1 * | 3/2015 | Katona | F21K 9/56 362/84 |
| 9,080,733 B2 * | 7/2015 | Rowley | F21K 9/90 |

(Continued)

*Primary Examiner* — Douglas W Owens
*Assistant Examiner* — James H Cho
(74) *Attorney, Agent, or Firm* — Han IP Corporation; Andy M. Han

(57) ABSTRACT

A light-emitting diode (LED)-based solid-state lamp (LED lamp) comprising four input ports, two bridge rectifiers, two interface modules, an LED driving circuit, and LED arrays operates normally for an input voltage applied from any two of the input ports without operational uncertainty and a fire hazard. The LED driving circuit is configured to provide a regulated power and current to drive the LED arrays. With a cycle-by-cycle triac switching and current control, an over-rated surge current is limited, preventing any fire hazards possibly occurred in the ballast when operated with the LED lamp. With various electrical connection terminals, the lamp can fit and operate in various lamp fixtures comprising two-pin, four-pin, or Edison-base sockets.

16 Claims, 14 Drawing Sheets

Related U.S. Application Data filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/535,249, filed on Jun. 27, 2012, now abandoned.

(51) Int. Cl.
*H02M 1/00* (2006.01)
*F21Y 115/10* (2016.01)

(56) References Cited

U.S. PATENT DOCUMENTS

| | | | |
|---|---|---|---|
| 2009/0261706 A1* | 10/2009 | Sorella | F21V 29/004 |
| | | | 313/46 |
| 2010/0148673 A1* | 6/2010 | Stewart | H05B 33/0803 |
| | | | 315/121 |
| 2011/0121756 A1* | 5/2011 | Thomas | H05B 33/0809 |
| | | | 315/294 |
| 2014/0225520 A1* | 8/2014 | Zhang | H05B 33/0809 |
| | | | 315/188 |
| 2014/0239834 A1* | 8/2014 | Choi | H05B 33/0809 |
| | | | 315/205 |

* cited by examiner

SOLID-STATE LIGHTING WITHOUT OPERATIONAL UNCERTAINTY AND FREE OF FIRE HAZARD

CROSS-REFERENCE TO RELATED APPLICATIONS

The present disclosure is a continuation-in-part (CIP) application of U.S. patent application Ser. No. 15/050,363, filed 22 Feb. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. The above-identified applications are incorporated herein by reference in their entirety.

BACKGROUND

Technical Field

The present disclosure relates to light-emitting diode (LED) lamps that work with conventional fluorescent lamp fixtures originally configured to electrically connect to ballasts.

Description of the Related Art

Solid-state lighting from semiconductor light-emitting diodes (LEDs) has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of fire become especially important and need to be well addressed.

In today's retrofit application of an LED lamp to replace an existing fluorescent lamp, consumers may choose either to adopt a ballast-compatible LED lamp with an existing ballast used to operate the fluorescent lamp or to employ an AC mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, a ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, an AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effectively solution by using a universal LED lamp that can be used with the AC mains and is compatible with a ballast so that LED lamp users can save an initial cost by changeover to such a universal LED lamp followed by retrofitting the lamp fixture to be used with the AC mains when the ballast dies.

However, most of the LED lamp users will choose to use ballasts as their first choice without caring about the operation of the AC mains because of a budget issue. In some applications, recessed can lights and sconces use an old type of compact fluorescent lamp (CFL), also known as PL lamp, which is frequently confused with a new generation of CFL lamps. Lighting manufacturers want to sell them because once an end user buys a fixture associated with a specific type of PL lamp, she or he will be locked into buying such a type of lamps forever.

The new generation CFL lamps, having a spiral looking, use a common Edison (or medium) base that can screw into any common light socket to operate, thus widely being accepted to replace outdated incandescent bulbs to save energy, run cooler, and last longer. With a ballast built in, this new type CFL lamp features no-lead glass and will work in any position, base up, down, or horizontal. In some applications, these new CFLs will be modified to use a newer GU-24 base designed to prevent the end users from changing back to incandescent bulbs to meet government policy requirements. Nevertheless, millions of old style CFL lamps do not have a built-in ballast but a remote one located separate from the lamps. It has a base with pins protruding from the bottom, to plug in to the corresponding socket to work. In many of such an application, the ballast would usually be located somewhere inside the fixture. But in a recessed can light, the ballast will be on the top or side of the fixture, located in the ceiling between the rafters. It is not accessible from below, where one would normally be replacing a lamp. The average maintenance person is not supposed to go into the ceiling to walk the rafters and find a particular fixture in a particular room. In most cases, insulation will be covering the fixture in the attic, making it difficult to locate and remove an old ballast. This is why the LED lamp users will choose to use ballasts as their first choice.

The PL lamps have so many models with bases having different configurations, rated power, and numbers of pins. They are not interchangeable. For example, two-pin lamps cannot replace four-pin ones due to different startup processes/configurations to operate the lamps. A lamp with a larger rated power cannot replace one with smaller rated power, or a ballast fire may occur. Essentially, they all rely on external ballast that is installed in the fixture. Besides, it is difficult to obtain replacement bulbs because there are too many models for a store to stock all. Fortunately in the US, most of ballasts in lamp fixtures are types of electronic ballasts because they are more efficient than other types of ballasts. In electronic ballast category, there are only two types: rapid-start and instant-start. As a replacement lamp, a ballast-compatible LED lamp must be compatible with existing ballasts which are either rapid-start electronic ballasts with four outputs or instant-start with two outputs.

As mentioned above, a cost-effective solution may be to use a ballast as part of an LED driver to operate an LED lamp. For an LED lamp operating solely with a ballast, the power and current control is basically via an impedance or output voltage control. In the former case, when input frequency changes, the impedance changes, altering an AC current to flow into a driving circuit to operate the LED lamp. A ballast is, in practice, supposed to operate two or more lamps, and its output frequency of the ballast decreases as a load increases, meaning that the total power consumption does not linearly increase as the number of lamps used increases. In the worst case, an LED lamp that is designed for a group of two or three lamps in a fixture powered by a ballast may be burned out due to over-rated current flowing into LED arrays in the lamp if only one of such a lamp is installed in the fixture. For the latter case, the output voltage control approach may work with an electronic ballast. In general, conventional LED drivers sometimes fail to work with a ballast and to properly operate an LED lamp at a regulated power, resulting in unstable lighting output.

In this disclosure, the LED lamps operating with an AC power source are proposed, which are allowed to plug directly into a ballast or an AC mains driven fixtures, avoiding extra expense and disruption associated with replacing or modifying an existing light fixture to capture the benefits of LED lighting.

SUMMARY

The present disclosure aims to provide a novel approach that can be adopted to operate an LED lamp with input voltages applied from any two input ports or all four ports with an LED current regulated for a proper operation of the lamp.

The LED lamp that may include a plurality of LED printed circuit boards (LED PCBs), a light emission portion comprising LED arrays disposed on the LED PCBs, two bridge rectifiers each having two input ports, and an LED driving circuit is used to replace a fluorescent lamp in a retrofit or a newly-made lamp fixture that could have an existing ballast. When such an LED lamp is installed in the fixture, the two bridge rectifiers can detect which ports an input voltage is applied and make proper and necessary management so that the LED lamp can operate with the existing ballast or the AC mains without operational uncertainty no matter whether the ballast has two or four output ports.

The LED driving circuit may include a phase control module, a diac, a triac switch, and an output module comprising an output capacitor in parallel with a resistor to build up an output voltage and to power the LED arrays. The phase control module produces a phase shifted waveform such that the diac generates trigger pulses each time it breaks over, which in turn switch on or off of an electric current supplied to the LED arrays. With a cycle-by-cycle current control and over-voltage protection, the LED driving circuit effectively provides a regulated current and voltage to operate the LED arrays.

The light emission portion in the LED lamp may further include a heat sink assembly and at least one lighting tube and the LED arrays disposed on the plurality of LED PCBs in the at least one lighting tube. Connecting to the light emission portion is a lamp base portion comprising various electrical connection terminals, which may be of two or four pins types or of Edison-base types. In another embodiment, the LED lamp may include an adapter portion connected to the lamp base portion in a way that the various electrical connection terminals of two- or four-pin types can be accommodated without retrofitting the lamp because the lamp itself can accept an instant-start ballast with two output ports, a rapid-start ballast with four output ports, or AC mains.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF VARIOUS EMBODIMENTS

Figure 1:
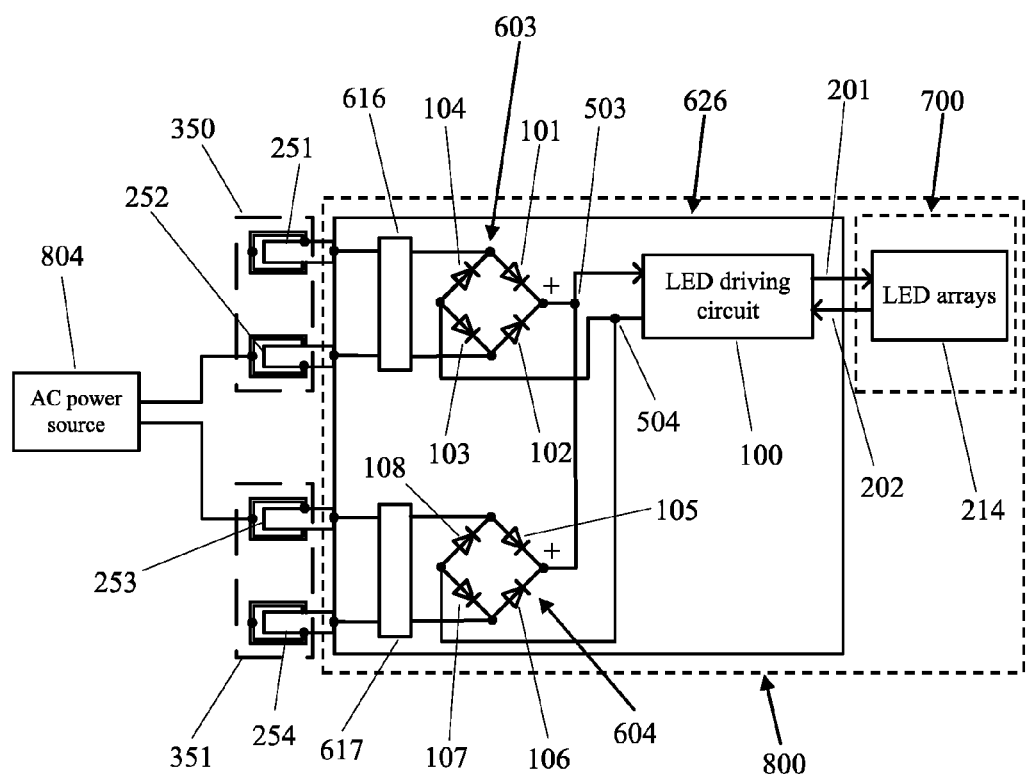
FIG. 1 is a block diagram of a universal LED lamp operable with an AC power source according to the present disclosure.

FIG. 1 is a block diagram of a universal LED lamp 800 operable with an AC power source according to the present disclosure. The universal LED lamp 800 comprises a number of components, including: a light emission portion 700 comprising LED arrays 214; a lamp base portion 626 comprising electrical connection terminals 251, 252, 253, and 254; two bridge rectifiers 603 and 604; two interface modules 616 and 617; and an LED driving circuit 100. The two bridge rectifiers 603 and 604 receive power from an alternating-current (AC) power source 804 via the two interface modules 616 and 617 and the four electrical connection terminals 251, 252, 253, and 254 and convert AC into direct-current (DC). The AC power source 804 may be a rapid-start or an instant-start ballast or AC mains. The electrical connection terminals 251 and 252 connect to a fixture socket 350, and the electrical connection terminals 253 and 254 connect to the other fixture socket 351. Each of the two interface modules 616 and 617 is configured to mimic a filament circuit connecting between the electrical connection terminals 251 and 252 and between the electrical connection terminals 253 and 254 to work with a rapid-start ballast so that the ballast can continue a process in its startup operation that is used for fluorescent lamps. Because the universal LED lamp 800 may be utilized to replace a fluorescent lamp that operates with a ballast, the universal LED lamp 800 must be compatible with the ballast. Otherwise, an initial startup failure will occur, and the universal LED lamp 800 will not light up. Each of the two interface modules 616 and 617 must have a low impedance such as less than hundreds of ohms at a high frequency such as 45 kHz or higher when operated with a rapid-start ballast and a high impedance such as several of kilo ohms at 50/60 Hz when operated with AC mains. The best choice is to make such high and low impedances in a way that an impedance ratio between the high impedance and the low impedance is higher than 13 at frequencies between 60 Hz and 45 kHz. In the case that the two interface modules 616 and 617 have a low impedance, for example, 10 ohms or less at 60 Hz, frequently used as a filament circuit for a fluorescent tube, when the AC mains are accidentally applied between the electrical connection terminals 251 and 252 or between the electrical connection terminals 253 and 254, a large current can flow through and burn out the two interface modules 616 and 617 immediately, thereby causing a fire hazard. After detecting such a filament circuit in the two interface modules 616 and 617, the ballast will start to generate a high voltage, which will appear between the fixture sockets 350 and 351. The LED driving circuit 100 is connected to the bridge rectifiers 603 and 604 through two interconnecting ports 503 and 504. The first bridge rectifier 603 comprises four diodes, 101, 102, 103, and 104 while the second bridge rectifier 604 comprises four diodes, 105, 106, 107, and 108. In the first bridge rectifier 603, the four diodes 101-104 are interconnected with four input/output ports. Similarly, in the second bridge rectifier 604, the four diodes 105-108 are interconnected with four input/output ports. The two bridge rectifiers 603 and 604 are connected to the LED driver 100 in parallel such that the positive and the negative input/output ports 503 and 504 of the first bridge rectifier 603 respectively connect to the positive and the negative input/output ports of the second bridge rectifier 604. The high electric potential at the input/output port 503 and the low electric potential at the input/output port 504 then respectively connect to the high side and the low side of the LED driving circuit 100 with the low electric potential port 504 as a common ground. Furthermore, the eight diodes 101-108 in the two bridge rectifiers 603 and 604 are partially paired to perform a full-wave rectification of an AC voltage from the ballast or the AC mains according to wiring configuration in the lamp fixture. A diode conducts an electric current if it is forward biased but blocks a current flow if it is reversed biased. Taking advantage of this property, each diode in the bridge rectifiers 603 and 604 can sense an electric potential difference between its two ports and convert AC to DC if an AC voltage is applied to a circuit with a diode connected in a proper manner. With the eight diodes 101-108 configured in the present disclosure, the two bridge rectifiers 603 and 604 can control the electric current flows into and returns from the LED driver 100, thus delivering a power to the LED driver 100.

In FIG. 1, when the four electrical connection terminals 251, 252, 253, and 254 of the universal LED lamp 800 are installed in the fixture sockets 350 and 351, a high AC voltage from the AC power source 804 may appear between a pair of the electrical connection terminals such as, for example, 251 and 253, 251 and 254, 252 and 253, or 252 and 254. For the first case, assume that the high AC voltage from the ballast or the AC mains appears between the electrical connection terminals 251 and 253. Through the interface module 616, the diode 101 in the bridge rectifier 603 detects an electric current path and conducts a positive cycle of an electric current from the electrical connection terminals 251, through the interface module 616, the diode 101, and the input/output port 503, to the LED driving circuit 100, and continuing to the LED arrays 214 through a port 201, returning from the LED arrays 214 through a port 202, the LED driving circuit 100, the input/output port 504, the diode 108, and the interface module 617 to the electrical connection terminal 253, thus delivering a power to the LED arrays 214. In this electric current path, the diode 101 of the bridge rectifier 603 and the diode 108 of the bridge rectifier 604 are forward biased whereas the diodes 102, 103, and 104 of the bridge rectifier 603 and the diodes 105, 106, and 107 of the bridge rectifier 604 are reversed biased, so the electric current can go through a correct path from the electrical connection terminal 251 to the electrical connection terminal 253. Similarly for a negative cycle, except that the diodes 105 and 104 are forward biased, all the other diodes 101, 102, 103, 106, 107, and 108 are reversed biased, an electric current can start from the electrical connection terminal 253, through the interface module 617, the diodes 105 in the bridge rectifier 604, and the input/output port 503, to the LED driving circuit 100, and continuing to the LED arrays 214, returning from the LED arrays 214, through the LED driving circuit 100, the input/output port 504, the diode 104 of the bridge rectifier 603, and the interface module 616, to the electrical connection terminal 251, thus delivering a power to the LED arrays 214.

When the instant-start ballast or the AC mains, connects to, for example, the electrical connection terminals 252 and 253, the diode 102 in the bridge rectifiers 603 conducts in a positive cycle. The electric current can flow from the electrical connection terminal 252, through the interface module 616, the diodes 102 in the bridge rectifier 603, and the input/output port 503, to the LED driving circuit 100, continuing to the LED arrays 214, returning from the LED arrays 214, through the LED driving circuit 100, the input/output port 504, the diode 108 in the bridge rectifier 604, and the interface module 617 to the electrical connection terminal 253, thus delivering a power to the LED arrays 214. In a negative cycle, the diode 105 in the bridge rectifier 604 conducts electricity. The electric current can flow from the electrical connection terminal 253, through the interface module 617, the diodes 105 in the bridge rectifier 604, and the input/output port 503, to the LED driving circuit 100, continuing to the LED arrays 214, returning from the LED arrays 214, through the LED driving circuit 100, the input/output port 504, the diode 103 in the bridge rectifier 603, and the interface module 616, to the electrical connection terminal 252, thus delivering a power to the LED arrays 214.

Similarly for other possible cases, the two bridge rectifiers 603 and 604 can always find a correct path for an electric current to flow into and from the LED arrays 214, thus delivering power to the LED arrays 214. This means that when such a universal LED lamp 800 is installed in the fixture, the two bridge rectifiers 603 and 604 can detect at which ports an input voltage is applied and make proper current path so that the universal LED lamp 800 can operate without operational uncertainty with the existing AC power source no matter whether the AC power source has two or four output ports.

As mentioned above, the designs of two bridge rectifiers and two interface modules that have the low impedance at a high frequency such as 45 kHz for using with an electronic ballast and a high impedance at 60 Hz are critical to operate the universal LED lamp 800 and prevent a fire from occurring. The low impedance at 45 kHz ensures a filament test current from the rapid-start ballast can pass through to proceed with a high operating voltage while the high impedance at 60 Hz guarantees that there will not be a fire hazard. As shown in FIG. 1, the inclusion of the two bridge rectifiers 603 and 604 ensures an input AC voltage from any two inputs, even not symmetric such as from the electrical connection terminals 251 to 254, can operate the universal LED lamp 800 without operational uncertainty.

Figure 2:
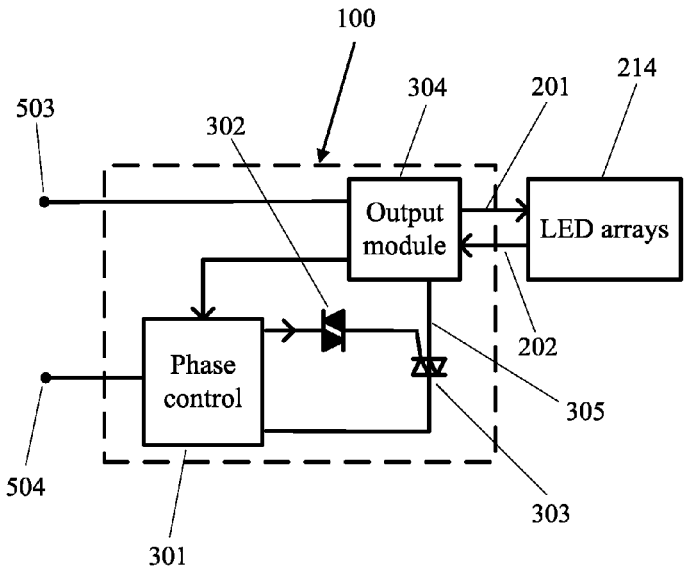
FIG. 2 is a block diagram of an LED driving circuit used in a universal LED lamp operable with an AC power source according to the present disclosure.

FIG. 2 is a block diagram of an LED driving circuit 100 used in a universal LED lamp (e.g., universal LED lamp 800) operable with a ballast according to the present disclosure. The LED driving circuit 100 comprises a phase control module 301, a diac 302, a triac switch 303, and an output module 304. The LED driving circuit 100 is coupled to receive a DC voltage from the two bridge rectifiers 603 and 604 (in FIG. 1) through the interconnecting ports 503 and 504. The output module 304 comprises a resistor and an output capacitor in parallel with the resistor connected between the two bridge rectifiers 603 and 604 through the interconnecting ports 503 and 504 and the triac switch 303 to build up an output voltage and to power the LED arrays 214. The triac switch 303 is controlled by the phase control module 301 through the diac 302. The phase control module 301, comprising at least one resistor and at least one capacitor, receives signals from the output module 304 and produces a phase-shifted waveform for the diac 302 to generate trigger pulses each time the diac 302 breaks over. By a cycle-by-cycle switching, the phase control module 301, the diac 302, and the triac switch 303 can regulate an electric current operating the LED arrays 214.

Figure 3:
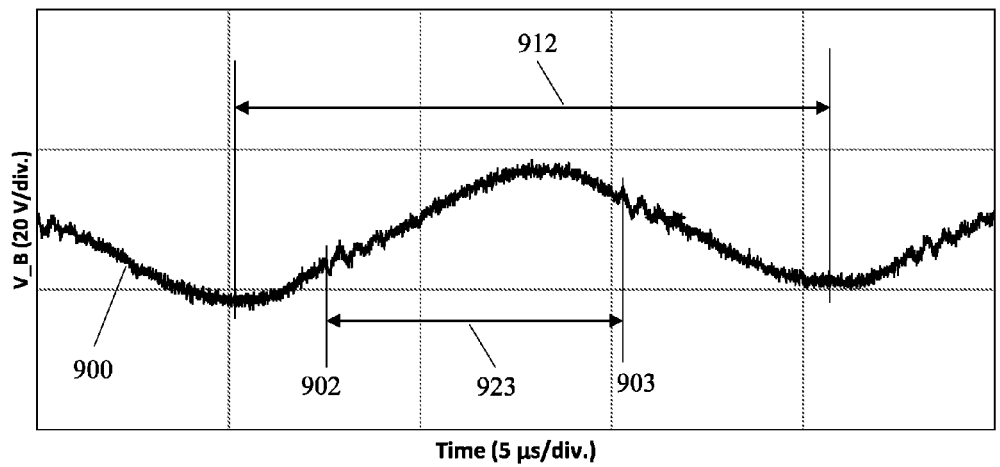
FIG. 3 is a waveform of input AC voltage measured at input of an LED lamp powered by an AC power source according to the present disclosure.

FIG. 3 is a waveform of an input AC voltage measured at input of a universal LED lamp powered by an electronic ballast according to the present disclosure. As shown, the voltage waveform 900 has a period 912 of approximately 16 μs, corresponding to a frequency of approximately 62.5 kHz. Each time the triac switch 303 (in FIG. 2) is triggered on or off by the diac 302, a series of voltage glitches occur. FIG. 3 shows onsets of such voltage glitches 902 and 903 in each AC cycle with a time difference 923 of approximately 7.5 μs.

Figure 4:
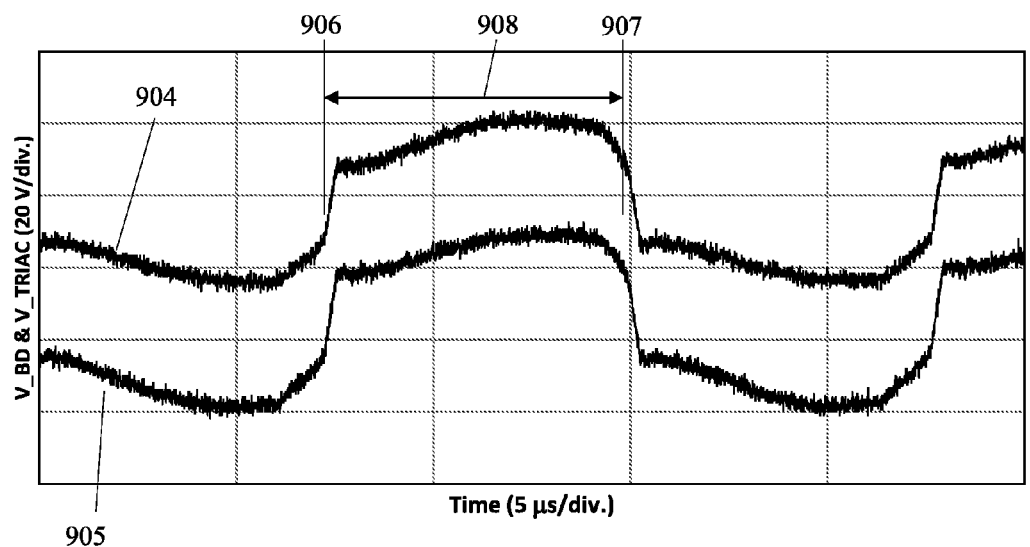
FIG. 4 shows two voltage waveforms measured, one across LED arrays and triac switch and the other across the triac switch according to the present disclosure.

FIG. 4 shows two voltage waveforms measured, one across LED arrays and triac switch and the other across the triac switch when an electronic ballast is used to operate a universal LED lamp according to the present disclosure. The first voltage waveform 904 records a voltage across the input port 201 (in FIG. 2) of the LED arrays 214 and the input/output port 504 of the bridge rectifiers 603 and 604. The second voltage waveform 905 records a voltage across an input port 305 of the triac switch 303 (in FIG. 2) and the input/output port 504 of the bridge rectifiers 603 and 604. Trigger pulses generated by the phase control module 301 and the diac 302 occur at 906 and 907 with a time elapse 908 of approximately 7.5 μs, which is a little less than a half cycle of 8 μs, but the same as the time difference 923 observed in FIG. 3.

Figure 5:
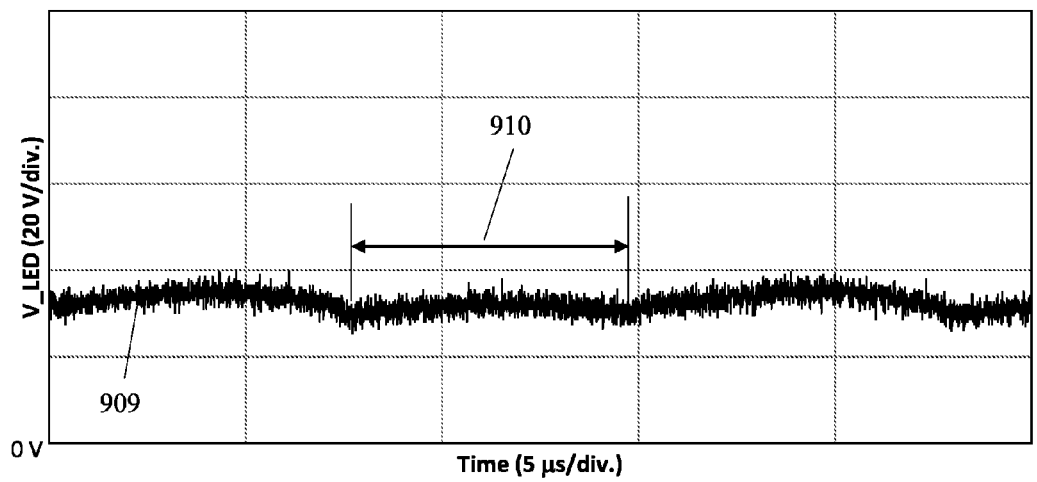
FIG. 5 is a voltage waveform measured across LED arrays according to the present disclosure.

FIG. 5 is a voltage waveform measured across LED arrays when a power from an electronic ballast is used to operate a universal LED lamp according to the present disclosure. The voltage waveform 909 recorded across the LED arrays 214 (in FIG. 2) shows an average of a forward voltage of the LED arrays 214 that is used to operate the LED arrays 214. The voltage waveform 909 also shows a periodicity 910 of 7.5 μs.

Figure 6:
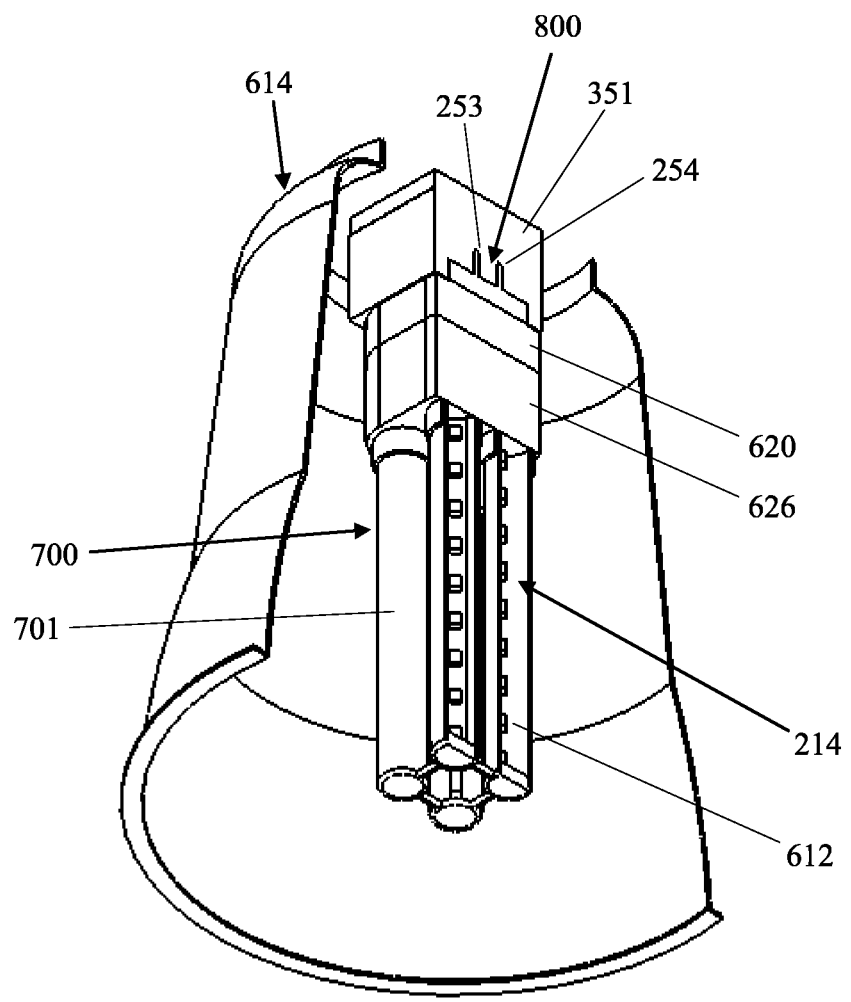
FIG. 6 is a sectional view of a universal LED lamp in a fixture according to the present disclosure.
Figure 7:
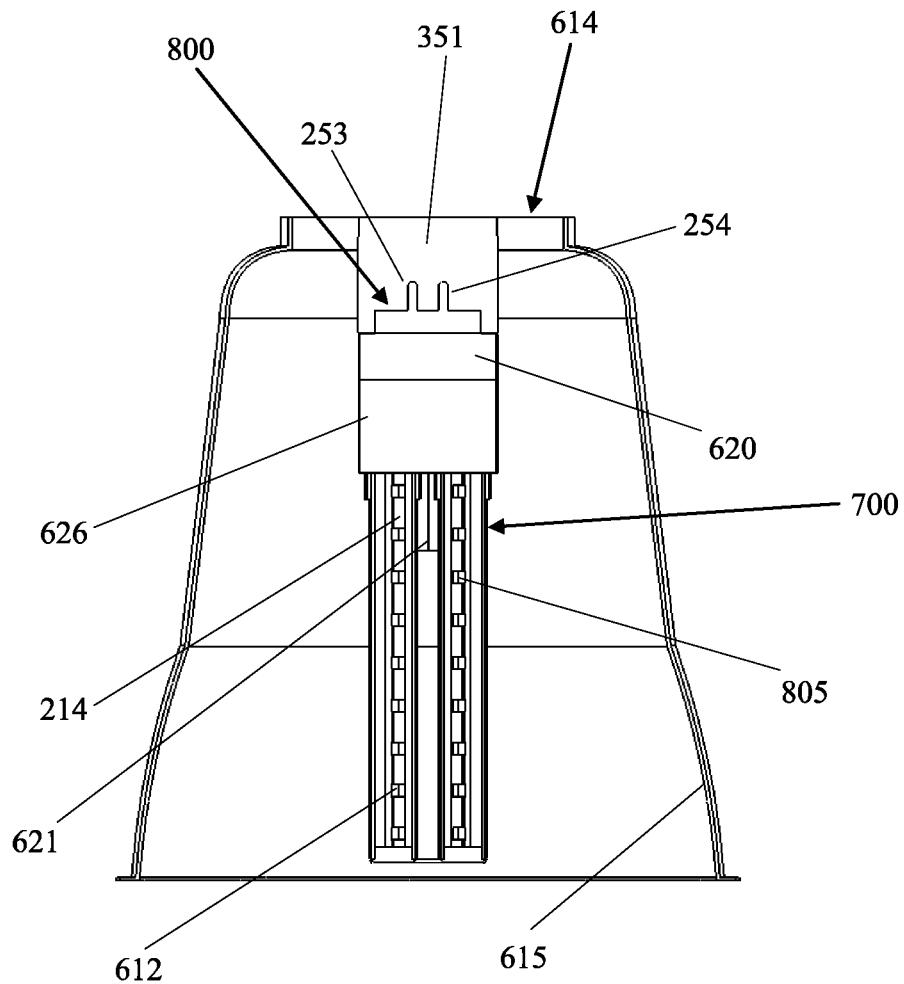
FIG. 7 is another sectional view of a universal LED lamp in a fixture to show part of a heat sink structure in the lamp according to the present disclosure.
Figure 8:
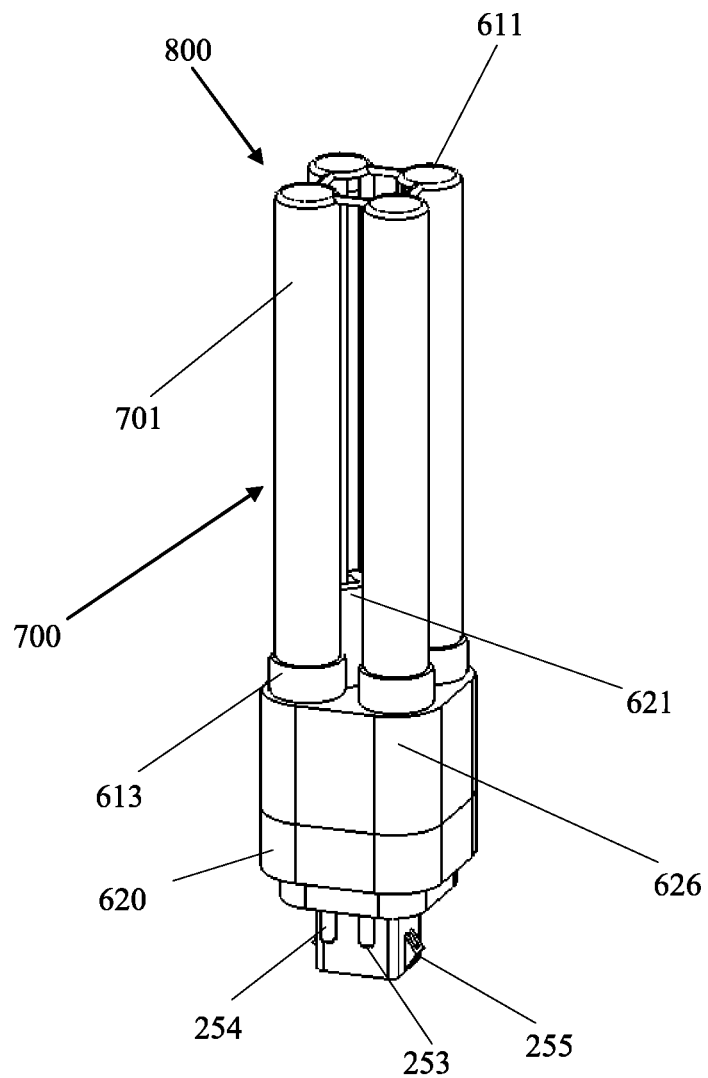
FIG. 8 is an illustration of a universal LED lamp according to the present disclosure.
Figure 9:
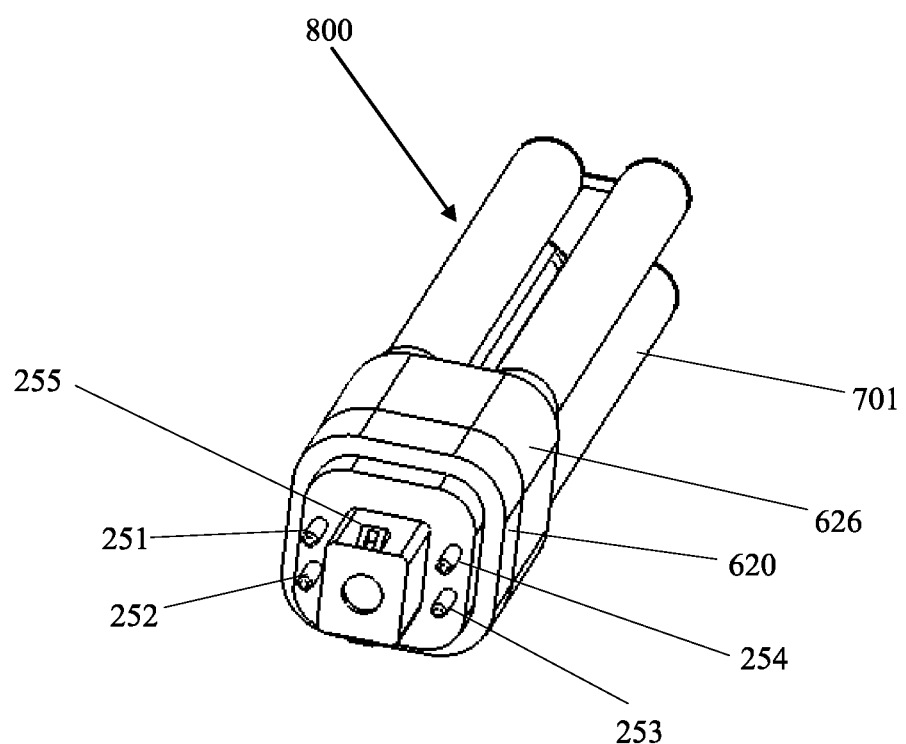
FIG. 9 is an illustration of a universal LED lamp showing electrical connection terminals of four pins according to the present disclosure.
Figure 10:
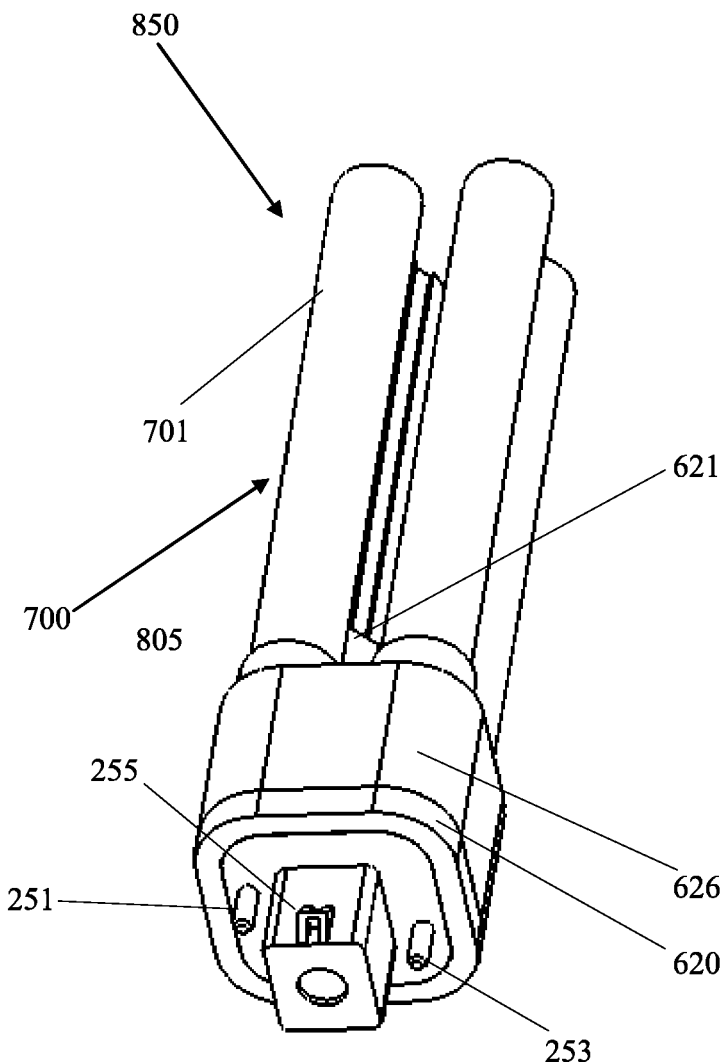
FIG. 10 is an illustration of a universal LED lamp showing electrical connection terminals of two pins according to the present disclosure.
Figure 11:
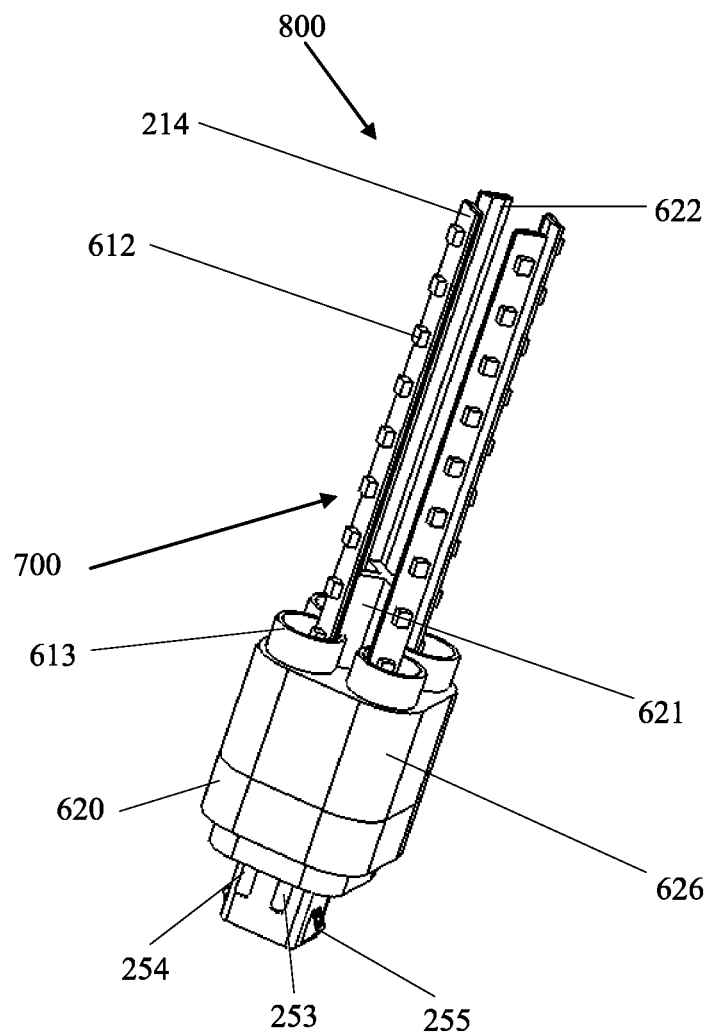
FIG. 11 is an illustration of a universal LED lamp showing a heat sink structure according to the present disclosure.

FIG. 6 is a sectional view of a universal LED lamp 800 in a fixture operated with an AC power source according to the present disclosure. FIG. 7 is another sectional view of the universal LED lamp of FIG. 6 in a fixture to show part of a heat sink structure in the lamp. FIG. 8 is an illustration of a universal LED lamp. FIG. 9 is an illustration of a universal LED lamp showing electrical connection terminals of four pins. FIG. 10 is an illustration of a universal LED lamp showing electrical connection terminals of two pins. FIG. 11 is an illustration of a universal LED lamp showing a heat sink structure. As shown in FIGS. 6-11, the universal LED lamp 800, plugged into a fixture 614 (in FIGS. 6 and 7) through the sockets 251 (not shown) and 351, comprises a light emission portion 700 and a lamp base portion 626. The lamp base portion 626 may further comprise an adapter portion 620 comprising the electrical connection terminals 251, 252, 253, and 254 protruding outwards (in FIG. 9). Inside of the lamp base portion 626 is a hollow space that can accommodate the two interface modules 616 and 617, the two bridge rectifiers 603 and 604 (in FIG. 1), and the LED driving circuit 100. The light emission portion 700 comprises at least one lighting tube 701 in which the LED arrays 214 with a plurality of LEDs 612 on the LED PCBs are disposed in each of the at least one lighting tube 701. To secure the at least one lighting tube 701 on the lamp base portion, a tube holder 613 for each of the at least one lighting tube 701 is used (in FIG. 8). Because of such a design of the at least one lighting tube 701 in the light emission portion 700, the universal LED lamp 800 has an omnidirectional intensity that can ultimately create a more uniform and comfortable light output from the fixture 614 by using internal reflections through an inner surface 615 (in FIG. 7) of the fixture 614. In FIG. 8, a lid 611 of the lighting tube is used to diffuse the light flux and to prevent dusts from entering the lighting tube 701. In FIGS. 8-10, a gadget 255 is used to secure the universal LED lamp 800 once it is inserted into the fixture socket. In FIG. 10, there are only the two electrical connection terminals 251 and 253 protruding for electrical connections to an instant-start ballast. To effectively disperse a heat generated by the LED arrays 214, the universal LED lamp 800 may comprise a base heat sink 621 (in FIGS. 7 and 8) with an adjustable length such that a universal LED lamp 800 with higher power comprises a longer heat sink. The base heat sink 621 is disposed in the central area encircled by the at least one lighting tube 701. In FIG. 11, the LED arrays 214 are mounted on the vertical heat sink 622 connecting to and extending from the base heat sink 621.

Figure 12:
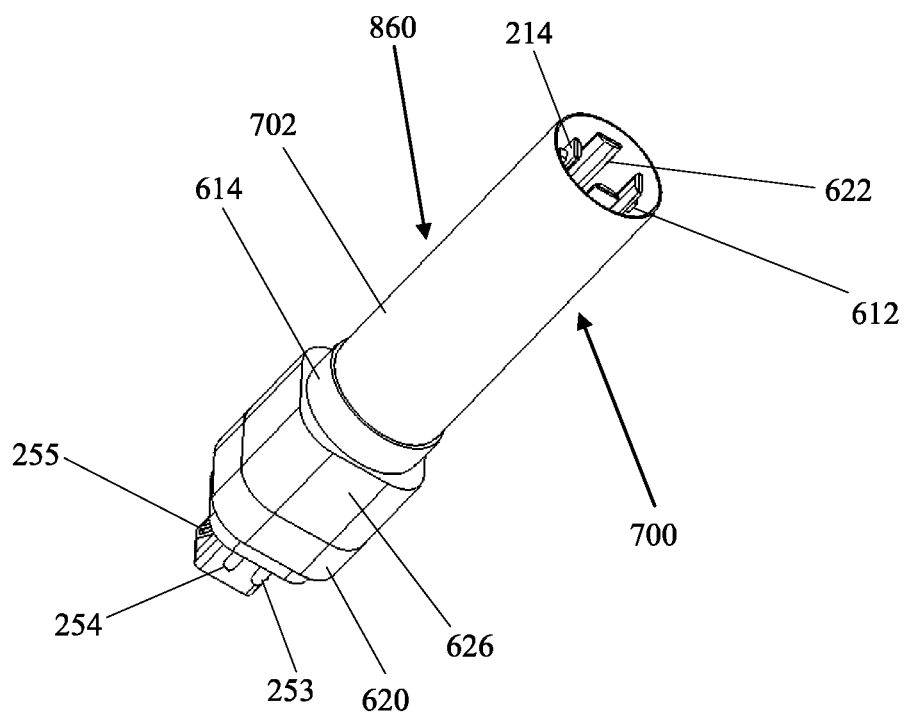
FIG. 12 is an illustration of a universal LED lamp showing one lighting tube according to the present disclosure

FIG. 12 is an illustration of a universal LED lamp showing one lighting tube according to the present disclosure. In FIG. 12, a universal LED lamp 860 comprises all the components depicted in FIG. 8 except that the light emission portion 700 comprises only one lighting tube 702 with a tube holder 614 used to secure the lighting tube 702 on the lamp base portion.

Figure 13:
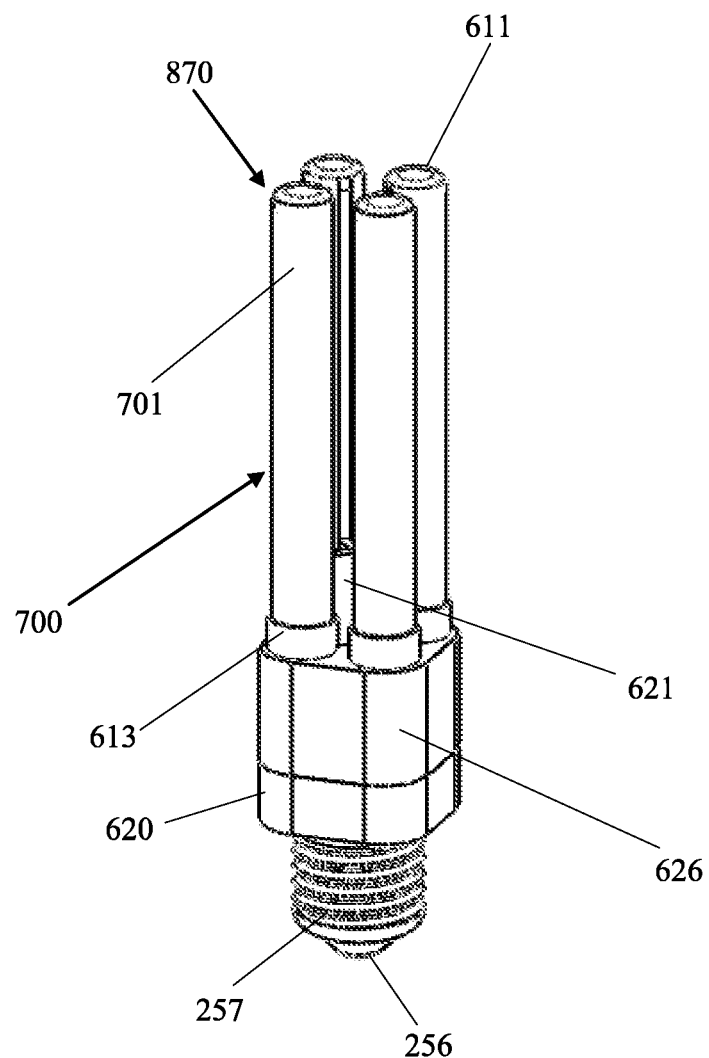
FIG. 13 is an illustration of a universal LED lamp showing electrical connection terminals of an E26/27 base according to the present disclosure.

FIG. 13 is an illustration of a universal LED lamp showing electrical connection terminals of an E26/27 base according to the present disclosure. In FIG. 13, a universal LED lamp 870 comprises all the components depicted in FIG. 8 except that the electrical connection terminals of an E26/E27 base are used. The electrical connection terminals comprise two electrical contacts 256 and 257, which can be screwed in a common E26/27 base socket to receive AC voltage from a power source.

Figure 14:
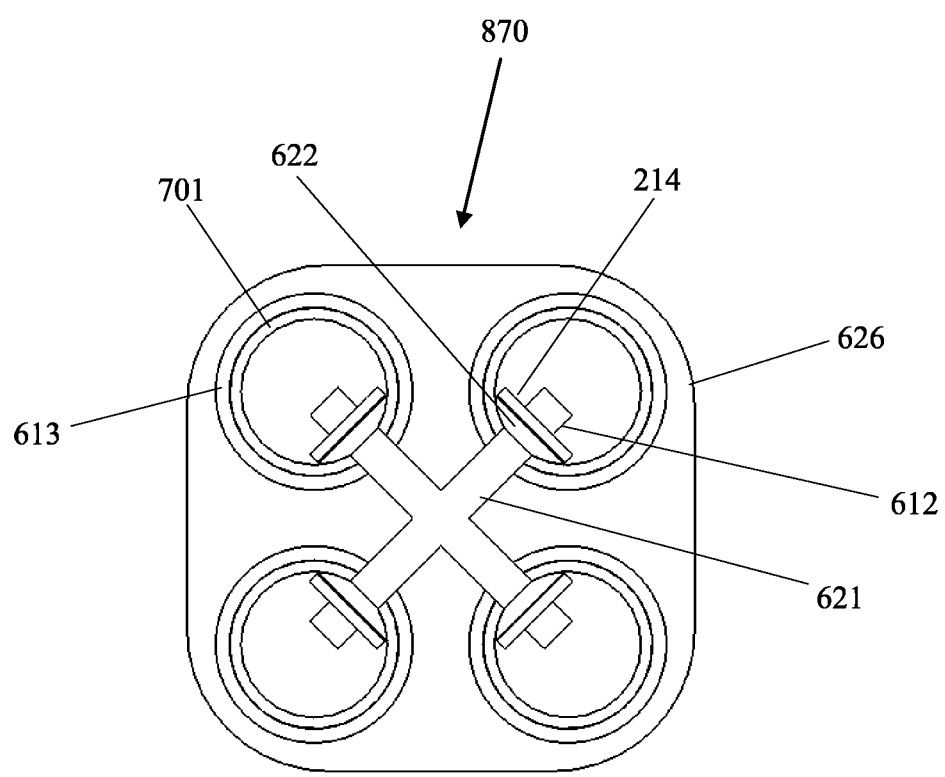
FIG. 14 is a top view of a universal LED lamp according to the present disclosure.

FIG. 14 is a top view of a universal LED lamp according to the present disclosure. In FIG. 14, a universal LED lamp 870 comprises all the components depicted in FIG. 8. As shown, the LED arrays 214 are mounted on the vertical heat sink 622 connecting to and extending from the base heat sink 621. The vertical heat sink 622 and the base heat sink 621 are disposed in the central area encircled by the at least one lighting tube 701. Although the universal LED lamp 870 is labeled here, it may be the universal LED lamp 800 because their top view is the same.

Figure 15:
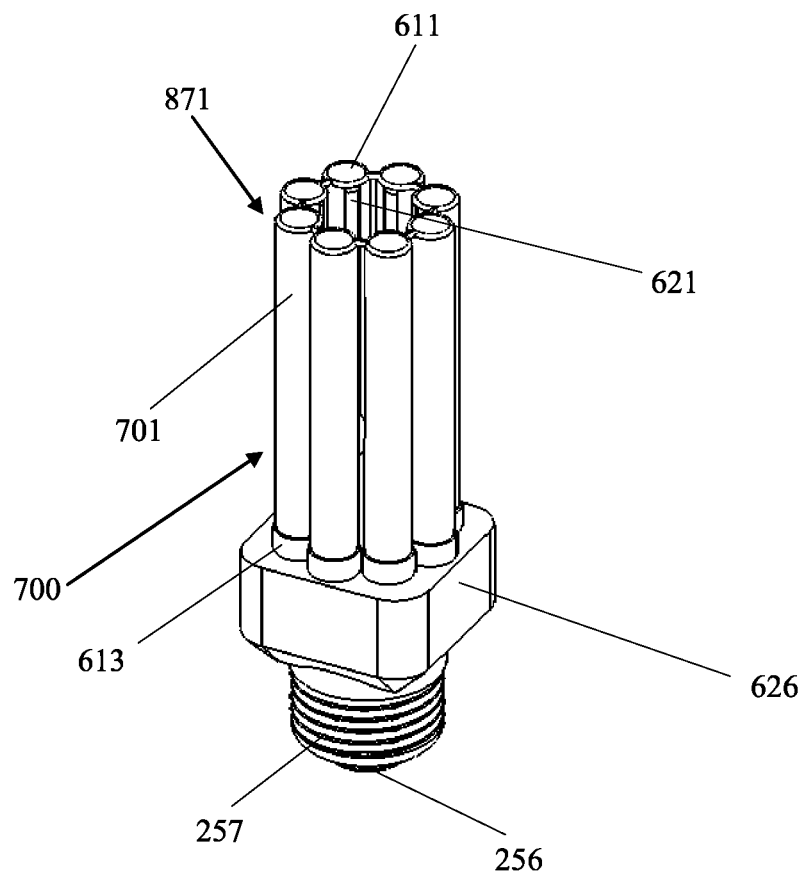
FIG. 15 is an illustration of a universal LED lamp showing electrical connection terminals of an E39 base according to the present disclosure.

FIG. 15 is an illustration of a universal LED lamp showing electrical connection terminals of an E39 base according to the present disclosure. In FIG. 15, a universal LED lamp 871 comprises all the components depicted in FIG. 13 except that eight lighting tubes and the electrical connection terminals of an E39 base are used, in which the electrical connection terminals comprise two electrical contacts 256 and 257 to receive AC voltage from a power source. Although the E39 base is shown in FIG. 14, the electrical connection terminals may be an E26/E27 base.

Figure 16:
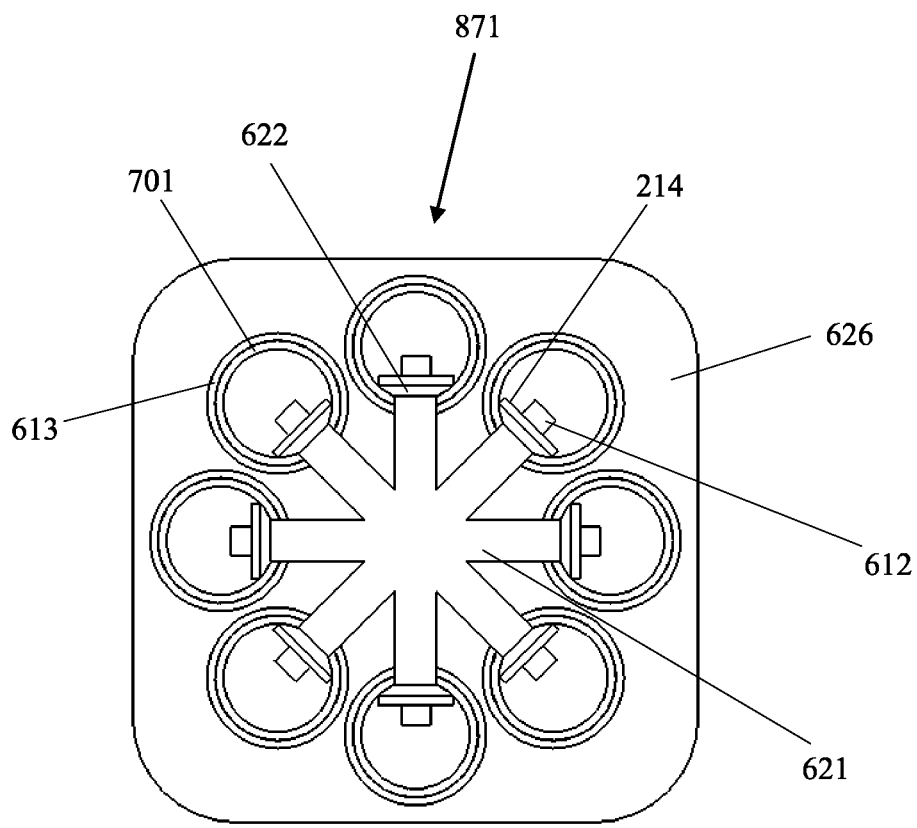
FIG. 16 is a top view of a universal LED lamp with multiple lighting tubes according to the present disclosure.

FIG. 16 is a top view of a universal LED lamp with multiple lighting tubes according to the present disclosure. In FIG. 16, a universal LED lamp 871 comprises all the components depicted in FIG. 13 except that eight lighting tubes are used. As shown, the LED arrays 214 are mounted on the vertical heat sink 622 connecting to and extending from the base heat sink 621. Because eight lighting tubes are used, the lamp base portion 626 is larger than that of the universal LED lamp with four lighting tubes.

In general, the universal LED lamp depicted in FIGS. 6-16 may fit in different sockets and thus may have different base types and shapes. Also although the universal LED lamp is shown to have two interface modules, the universal LED lamp may not have one. Nevertheless, the universal LED lamps may come in a wide variety of shapes and rest on various electrical connection terminals with base types fixed with two or four pins used in compact fluorescent lamps (CFLs) and compact fluorescent bulbs, two hi-pins used in G13 fluorescent tubes, or other E-base types used in other fluorescent lamps. Base types for two pin plug-in CFLs comprise G23, GX23, and G24d. For 4 pin plug-in CFLs, bases comprise G24q, Gx24q, and 2G11 Base types for compact fluorescent bulbs comprise two-pin GU24, GU10 and GU5.3. The E-base types comprise E26, E27, or E39.

Although the above embodiments use an LED lamp as an example, in fact, all the conventional fluorescent lamps used today can be replaced with the universal LED lamps adopting the LED driving circuit compatible with a ballast. Also although the above embodiments use the LED driving circuit compatible with a ballast as an example, in fact, the structures of the universal LED lamps disclosed may be used to replace all the conventional fluorescent lamps used today no matter whether the LED driving circuit is compatible with a ballast or operable with AC mains or both.

Whereas preferred embodiments of the present disclosure have been shown and described, it will be realized that alterations, modifications, and improvements may be made thereto without departing from the scope of the following claims. Another LED driving circuit with a voltage feedback module in an LED lamp using various kinds of combinations to accomplish the same or different objectives could be easily adapted for use from the present disclosure. Accordingly, the foregoing descriptions and attached drawings are by way of example only, and are not intended to be limiting.

What is claimed is:

1. A light-emitting diode (LED) lamp, comprising:
a plurality of LED printed circuit boards (LED PCBs);
a light emission portion comprising at least one lighting tube, LED arrays disposed on the plurality of LED PCBs in the at least one lighting tube, and a heat sink disposed in a central area encircled by the at least one lighting tube;
a lamp base portion connected to the light emission portion, the lamp base portion comprising at least two electrical connection terminals;
two interface modules, each connected to a respective one of the at least two electrical connection terminals;
at least one bridge rectifier coupled to the two interface modules, the at least one bridge rectifier configured to convert an alternating-current (AC) input voltage into a direct-current (DC) voltage; and
an LED driving circuit coupled to receive the DC voltage from the at least one bridge rectifier, the LED driving circuit comprising a phase control module, a diac, a triac switch controlled by the phase control module through the diac, and an output module, the output module comprising a resistor and an output capacitor in parallel configured to build up an output voltage and to power the LED arrays;
wherein each of the two interface modules has a high impedance at 60 Hz and low impedance at 45 kHz with a ratio higher than 13.

2. The LED lamp of claim 1, wherein the phase control module is configured to produce a phase-shifted waveform for the diac to generate trigger pulses each time the diac breaks over.

3. The LED lamp of claim 1, wherein the triac switch is configured to provide a cycle-by-cycle switching.

4. The LED lamp of claim 1, wherein the phase control module comprises at least one capacitor and at least one resistor.

5. The LED lamp of claim 1, wherein the phase control module is configured to receive signals from the output module.

6. The LED lamp of claim 1, wherein the triac switch is configured to regulate an electric current operating the LED arrays.

7. The LED lamp of claim 1, wherein the lamp base portion further comprises an adapter portion comprising electrical connection terminals.

8. The LED lamp of claim 7, wherein the electrical connection terminals in the adapter portion comprise four pins comprising a base of G24q, Gx24q, or 2G11.

9. The LED lamp of claim 7, wherein the electrical connection terminals in the adapter portion comprise two pins comprising a base of G23, GX23, or G24d.

10. The LED lamp of claim 7, wherein the electrical connection terminals in the adapter portion comprise two pins comprising a base of GU24, GU10, or GU5.3.

11. The LED lamp of claim 7, wherein the electrical connection terminals in the adapter portion comprise a base of E26, E27, or E39.

12. The LED lamp of claim 1, wherein the at least two electrical connection terminals comprise four pins comprising a base of G24q, Gx24q, or 2G11.

13. The LED lamp of claim 1, wherein the at least two electrical connection terminals comprise two pins comprising a base of G23, GX23, or G24d.

14. The LED lamp of claim 1, wherein the at least two electrical connection terminals comprise two pins comprising a base of GU24, GU10, or GU5.3.

15. The LED lamp of claim 1, wherein the at least two electrical connection terminals comprise a base of E26, E27, or E39.

16. The LED lamp of claim 1, wherein the at least two electrical connection terminals comprise a base of G13.

* * * * *